US007090749B2

(12) United States Patent
Flores et al.

(10) Patent No.: US 7,090,749 B2
(45) Date of Patent: Aug. 15, 2006

(54) METHOD AND APPARATUS FOR SIMULATING APPLICATION WORKLOADS ON AN E-BUSINESS APPLICATION SERVER

(75) Inventors: Romelia Flores, Keller, TX (US); Leonard S. Hand, Red Creek, NY (US); Philip E. Reed, Arlington, TX (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 09/919,438

(22) Filed: Jul. 31, 2001

(65) Prior Publication Data

US 2003/0036897 A1   Feb. 20, 2003

(51) Int. Cl.
G06F 9/45 (2006.01)
G06F 11/30 (2006.01)
G06F 15/00 (2006.01)

(52) U.S. Cl. ........................... 203/22; 702/182
(58) Field of Classification Search ................. 703/22; 702/186, 182; 709/223
See application file for complete search history.

(56) References Cited

U.S. PATENT DOCUMENTS

| | | | | |
|---|---|---|---|---|
| 5,657,438 A * | 8/1997 | Wygodny et al. | ............... | 714/1 |
| 5,812,780 A * | 9/1998 | Chen et al. | .................. | 709/224 |
| 5,974,572 A * | 10/1999 | Weinberg et al. | ............. | 714/47 |
| 6,002,871 A * | 12/1999 | Duggan et al. | ............. | 717/135 |
| 6,167,534 A * | 12/2000 | Straathof et al. | ............. | 714/38 |
| 6,360,332 B1 * | 3/2002 | Weinberg et al. | ............... | 714/4 |
| 6,434,513 B1 * | 8/2002 | Sherman et al. | ............ | 702/186 |
| 6,477,483 B1 * | 11/2002 | Scarlat et al. | ................ | 702/186 |
| 6,522,995 B1 * | 2/2003 | Conti et al. | .................. | 702/186 |
| 6,587,879 B1 * | 7/2003 | Reynolds | ..................... | 709/224 |
| 6,601,020 B1 * | 7/2003 | Myers | .......................... | 702/186 |
| 6,701,363 B1 * | 3/2004 | Chiu et al. | ................... | 709/224 |
| 6,754,701 B1 * | 6/2004 | Kessner | ...................... | 709/219 |
| 6,775,644 B1 * | 8/2004 | Myers | .......................... | 702/186 |

OTHER PUBLICATIONS

Merriam-Webster's Collegiate Dictionary, Tenth Edition, Merriam-Webster, Incorporated, Springfield, Massachusetts, USA, 1993, p. 885.*
"Segue Software Announces Resource Monitoring of E-Business Applications with SilkMonitor" , Business/Technology Editors, Business Wire. New York: Oct. 25, 1999 p. 1.*
"LoadRunner: The Industry Standard Load Testing Tool" by Mercury Interactive Inc, Apr. 5, 2001, 6 pages printed from a pdf file.*

* cited by examiner

Primary Examiner—Paul L. Rodriguez
Assistant Examiner—Dwin M. Craig
(74) Attorney, Agent, or Firm—Akerman Senterfitt

(57) ABSTRACT

A method and system for simulating application workloads on an e-business application sewer hosting e-business application programs. A test driver can simulate different workloads and enable monitoring of e business applications. A work request for a placebo transaction can be forwarded to the application server for processing. The placebo transaction can be a workload used to test the application server by placing a load on the application server. The placebo transaction can emulate realtime tasks and activities within the application server. The workloads for the placebo transactions can require varying levels of processing resources. The placebo transaction can include hypertext transfer protocol (HTTP) traffic. A work request can include HTTP requests for accomplishing e-business related calculations, and retrieving and/or storing information in a database.

22 Claims, 1 Drawing Sheet

METHOD AND APPARATUS FOR SIMULATING APPLICATION WORKLOADS ON AN E-BUSINESS APPLICATION SERVER

BACKGROUND OF THE INVENTION

1. Technical Field

The present invention relates to the field of e-business, and more particularly, to a method and apparatus for simulating application workloads on an e-business application server.

2. Description of the Related Art

The pervasiveness of the Internet has allowed companies to exploit electronic communications to engage in what is commonly known as e-business activities with their customers. E-business involves conducting business on the Internet and not only includes buying and selling goods and services, but also includes servicing customers and collaborating with trading or business partners. To accommodate this vast range of activities, companies engaging in e-business have to ensure that their systems can optimally handle website traffic by implementing an effective traffic flow management policy.

A traffic flow management policy is a set of rules which dictate how workload should be handled by a system and its subsystems. A workload is a task or group of tasks that require system resources for processing. A work request can be used to initiate processing of a workload. An effective traffic flow management policy must assign and distribute tasks associated with a workload to various processing elements within the system and its subsystems. Moreover, to ensure optimal performance, the traffic flow management policy must constantly monitor system conditions and dynamically adjust the workload accordingly. Dynamic adjustment can include redistributing and rescheduling the tasks associated with a workload for processing.

E-business systems present a unique set of challenges to providing an effective traffic flow management policy. In e-business systems, legitimate overload conditions occur frequently and are generally unpredictable. A legitimate overload condition may result from several load factors which can include an increase in user demand, a partial website outage, and even the elimination of previous bottlenecks. For example, an increased user demand can occur when there are special events, promotions, and marketing campaigns. Furthermore, when overload occurs, system performance is significantly degraded and this results in diminished capacity. From an economic perspective, the diminished capacity results in lost opportunity which translates directly to lost revenue. Consequently, a provider utilizing an e-business system wants some assurance that its system is robust enough to effectively handle overload conditions.

Given the unique challenges presented by e-business systems, what is needed is an efficient method and system for ensuring that existing traffic flow management policies can effectively accommodate overload conditions.

SUMMARY OF THE INVENTION

The invention provides a method for simulating application workloads on an e-business application server hosting a plurality of e-business application programs. The method includes the steps of forwarding a placebo transaction work request to the application server and translating the forwarded work request into one or more computer program operations which are to be performed for the work request. Any commands associated with the computer program operations can subsequently be executed. In translating the forwarded placebo transaction work request, a workload identified by the forwarded placebo transaction work request can be determined. Upon determination of the workload identified by the placebo transaction work request, the computer program operations associated with a workload can be determined.

In forwarding the work request to the application server, a user identification (UID), a user priority and a workload identification (WLID) identifying the work request can be sent to a workload driver in the e-business application server. The user identification (UID), the user priority and the workload identification can be encapsulated in a HTTP header prior to the forwarding step. Alternately, the UID, the user priority and the WLID can be encapsulated in a URL string prior to the forwarding step. The UID, user priority and WLID can be forwarded from a user driver to the application server. The forwarded placebo transaction work request can be received by a workload driver. A load corresponding to the execution of commands that are to be executed for the placebo transaction work request can be applied to the e-business application server. Application of the load can indicate whether the traffic flow management policy can effectively handle overload conditions. The workload driver can be instantiated and/or hosted by the application server.

The invention also provides a system for application workload simulation on an e-business application server hosting a plurality of e-business application programs. The system can include a user driver, a configuration file and a workload driver. The user driver can generate placebo transaction work requests. The configuration file can include computer program commands which are associated with the placebo transaction work requests. The workload driver can be a servlet that can be instantiated by or hosted by the application server. Based on the contents of the configuration file, the workload driver can determine which of the computer program commands are to be executed for a particular placebo transaction work request by the user driver.

In accordance with the invention, a main workload driver can be configured as a core workload driver. Moreover, the system can further include a URL string within which, a UID, a priority and a WLID, can be encapsulated. Alternatively, the UID, the priority and the WLID, can be encapsulated in a HTTP header. The URL string and the HTTP header can be used for communicating the placebo transaction work request from the user driver to the workload driver.

BRIEF DESCRIPTION OF THE DRAWINGS

There is shown in the drawing embodiments which are presently preferred, it being understood, however, that the invention is not limited to the precise arrangements and instrumentalities shown, wherein.

DETAILED DESCRIPTION OF THE INVENTION

Figure 1:
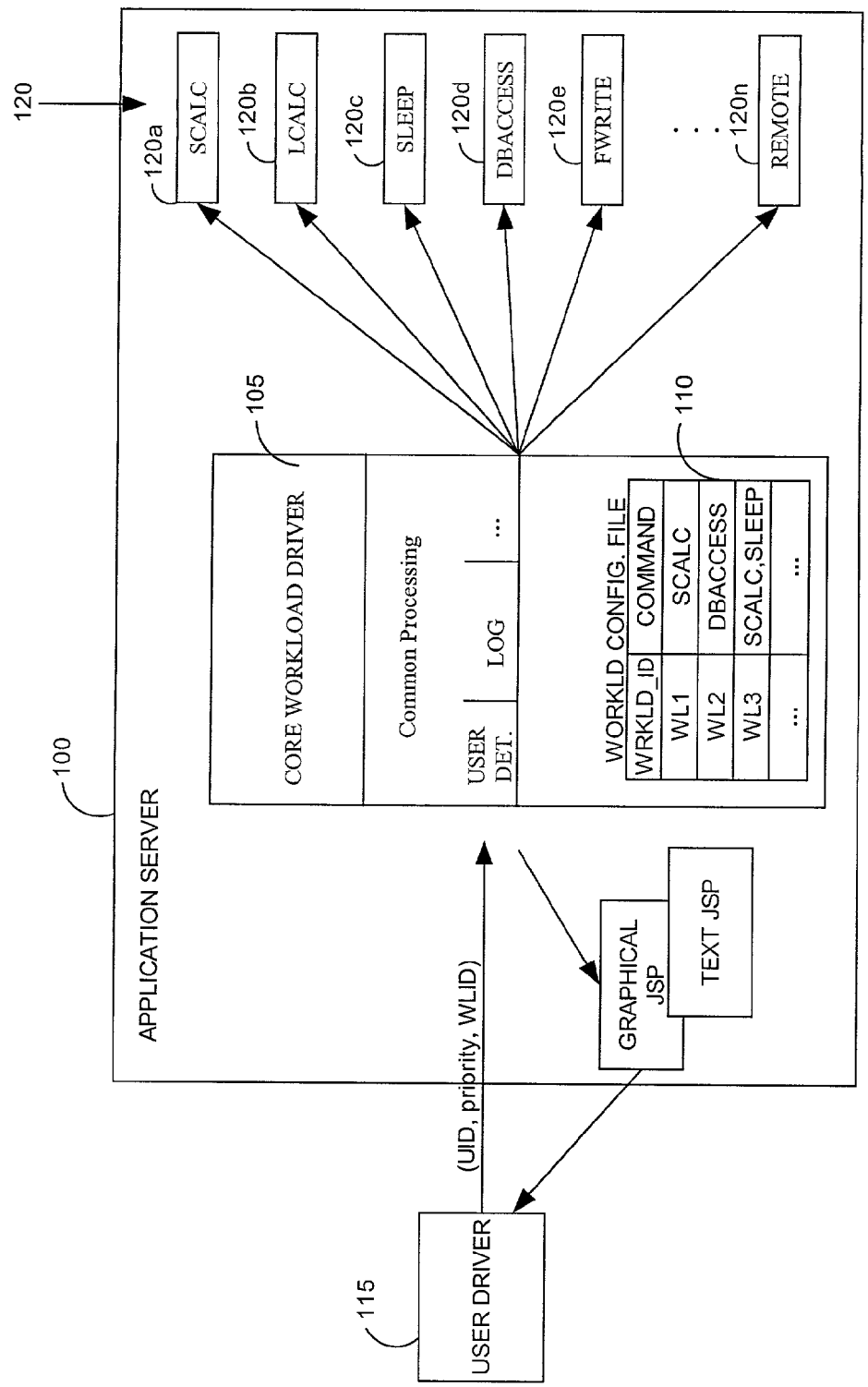
FIG. 1 is a high level block diagram of an exemplary system for providing dynamic workload control and transition.

The invention provides a method for simulating application workloads on an e-business application server hosting e-business application programs. A work request for a placebo transaction can be forwarded to the application server for processing. The work request can be a request to process a specified workload. The placebo transaction can be a workload used to test the application server by placing a load on the application server. The placebo transaction can include any kind of data traffic which can emulate realtime tasks and activities that can happen within the application server and its e-business applications environment. The workloads for the placebo transactions can be defined such that they require varying levels of processing resources. The placebo transaction can include hypertext transfer protocol (HTTP) traffic which is typical of Internet website traffic. Although HTTP can be utilized, other transfer protocols such as file transfer protocol (FTP) can be employed. Consequently, a work request can include HTTP requests for accomplishing e-business related calculations, and retrieving and/or storing information in a database.

The work request which can be forwarded to the application server can be translated into one or more computer program operations. By executing the computer program operations, a load is thereby placed on the application server. Translation of the work request can include determining an appropriate workload to be processed by the forwarded work request. Subsequent to determining the appropriate workload to be processed, any computer program operations associated with the workload can be determined. The computer program operations can include one or more workload commands that are to be executed.

In forwarding the work request to the application server, a user identification (UID), a user priority and a workload identification (WLID) identifying the work request can be sent to a workload driver. According to one aspect of the invention, the UID, the user priority and the workload identification can be encapsulated in a HTTP header. According to an alternative aspect of the invention, the UID, the user priority and the WLID can be encapsulated in a URL string. The UID, user priority and WLID can be forwarded from a user driver to the application server. The user driver can simulate website traffic by generating the HTTP requests that constitute a placebo transaction.

A servlet which can be initiated by the application server can be configured as a core (main) workload driver that receives work requests from the user driver to process a workload for a particular user. A servlet can be a Java program that extends the functionality of a Web server, generating dynamic content and interacting with web clients using a request-response paradigm. Here, the web client can be the user driver which issues hypertext transfer protocol (HTTP) requests to the core workload driver for workload processing. Although more than one workload drivers may be possible, a particular workload driver can be configured as the main workload driver and can be called a core workload driver.

Returning to the work request forwarded from the user driver to the application server, the work request can be received at the core workload driver and processed by the core workload driver. Additionally, the core workload driver can have an associated configuration file which includes information related to the workloads. This information can include, but is not limited to, the WLID and the associated workload commands to be executed for a particular workload.

In determining which workload will be executed, the core workload driver can utilize the WLID found in the HTTP header or the uniform resource locator (URL) string. The WLID can be used to locate the corresponding WLID entry in the configuration file. Once the workload is determined and the commands identified, the workload commands can be executed based on the user priority for a particular UID. Since the workload commands can contain varying levels of complexity and duration, various levels of workloads can be placed on the system merely by changing or reconfiguring the workload configuration file.

The invention also includes a system for application workload simulation on an e-business application server that hosts e-business application programs. The system can include a user driver, a configuration file and a workload driver. The user driver can provide user work requests to process a particular workload. The configuration file can include computer program commands which are associated with the workloads that are defined for the system.

The workload driver includes software logic that can be used to determine, based on information in located the configuration file, which of the computer program commands should be executed for a particular workload. In response to the request from the user driver, the core workload driver can consult a configuration file to determine the relevant command classes to be executed for a particular WLID. The core workload driver can also function as a driver for which workloads and associated command classes will be executed.

FIG. 1 is a high level block diagram of an exemplary system for providing workload simulation in an application server. Referring to FIG. 1, there is shown an application server 100, a user driver 115, a core workload driver 105, a representation of the workload configuration file 110, and workload commands classes 120 (120*a*–120*n*).

Application server 100 can be a platform that can deliver application services to servers, databases, clients and devices, which can be used to process e-business related transactions. Application servers are known in the art and depending on the vendor, can provide additional enhanced services to support vendee requirements. For example, some application servers can contain built in traffic flow management which can include traffic monitoring and control functions.

The user driver 115 can be an application which acts as a front end to the core workload driver 105. The user driver 115 can simulate website traffic in the form of users accessing the system. User driver 115 can have a user interface such as a graphical user interface (GUI) that can facilitate input of the UID, user priority and WLID pertaining to a particular user workload request. The user driver 115 can be configured to transfer these inputs to the core workload driver as part of the HTTP header or as part of the URL string.

The core workload driver 105 can be a servlet that runs on the application server 100, which can be configured to receive requests from the user driver 115 to process a workload for a particular UID. The core workload driver 105 can be a Java class the can be instantiated by the application server 100.

The workload configuration file 110 can be a configuration file that can define the individual commands or groups of commands that can be processed for a particular workload. Each workload defined in the configuration file 110 can have one or more commands which can vary in complexity and system processing requirements. The workload configuration can be formatted in XML format, which provides great flexibility in reconfiguring the workload for a system. An exemplary configuration file can be defined as follows:

```
<WORKLOAD name=WRKLD000 alt=WRKLD002 systemstatus=1>
    <COMMAND class=SCalc>
    </COMMAND>
</WORKLOAD>
<WORKLOAD name=WRKLD001 alt=WRKLD000 systemstatus=1>
    <COMMAND class=SCalc>
    <NumTimes>"20000000"</NumTimes>
    </COMMAND>
    <COMMAND class=FWrite>
        <Path>"/usr/tmp/megasite.fil"</Path>
        <Pattern>"\n Executing tests file I/O tests for project."
    </Pattern>
        <NumTimes>"250"</NumTimes>
    </COMMAND>
</WORKLOAD>
<WORKLOAD name=WRKLD002 alt=WRKLD001 systemstatus=1>
    <COMMAND class=Sleep>
        <Length>"5000"</Length>
    </COMMAND>
</WORKLOAD>
<WORKLOAD name=WRKLD003 alt=WRKLD000 systemstatus=1>
    <COMMAND class=DBAccess>
        <URL>"jdbc:db2://asil.spring.newnet:6789/STATES"</URL>
        <Driver>"COM.mbi.db2.jdbc.net.DB2Driver"</Driver>
        <Statement>"select state from DB2ADMIN.addr fetch first 3000 rows only"</Statement>
        <User>"db2admin"</User>
        <Passwd>"db2admin"</Passwd>
    </COMMAND>
</WORKLOAD>
<WORKLOAD name=WRKLD004 alt=WRKLD001 systemstatus=1>
    <COMMAND class=CThreads>
        <NumThreads>"300"</NumThreads>
    </COMMAND>
</WORKLOAD>
<WORKLOAD name=WRKLD005 alt=WRKLD001 systemstatus=1>
    <COMMAND class=FWrite>
        <Path>"C:\\temp\\test.txt"</Path>
        <Pattern>"//n This is a test!!! "</Pattern>
        <NumTimes>"530000"</NumTimes>
    </COMMAND>
</WORKLOAD>
<WORKLOAD name=WRKLD101 alt=WRKLD001 systemstatus=1>
    <%WORKLOAD name=WRKLD001>
    <%WORKLOAD name=WRKLD002>
    <%WORKLOAD name=WRKLD003>
    <%WORKLOAD name=WRKLD004>
    <%WORKLOAD name=WRKLD005>
    <COMMAND class=CThreads>
    </COMMAND>
</WORKLOAD>
```

Referring to the exemplary workload configuration, workload WRKLD000 has a single command that does a short calculation (SCalc) 120a. The load caused by executing WRKLD000 is expected to be negligible since the command is executed only once. Workload WRKLD001 includes two commands—SCalc 120a and FWrite 120e. Although SCalc command 120a is a short calculation, it is being executed twenty million times. By repeating a single command numerous times, the effect on the load on a system can be significant. The second command FWrite 120e in WRKLD001 is a write to a device such as a disk file, which is executed 250 times. The combined effect of the SCalc 120a and FWrite 120e commands of workload WRKLD0001 provides a substantially greater load than the load provided by workload WRKLD000 which has a single instance of the SCalc 120a command.

Workload WRKLD002 has a single sleep 120c command which lasts for a duration of 5000 CPU cycles. Workload WRKLD003 also has a single command, but is used to access a database and retrieve a maximum of 3000 rows of data. Workload WRKLD004 also has a single command, which is used to create 300 threads. Workload WRKLD005 also has a single command FWrite 120e which does a write access to a file 530 thousand times. Workload WRKLD101 is a user defined workload consisting of multiple workloads including, WRKLD001, WRKLD002, WRKLD003, WRKLD004, WRKLD005, and Cthreads command class respectively. Workload WRKLD101 illustrates the flexibility and advantage provided by utilizing the configuration file 110. By defining the workloads in a configuration file 110, the code associated with the commands can be reused to build workloads having varying complexities and load processing requirements. The exemplary configuration file 110 is used for illustrative purposes and is not intended to limit the invention.

In operation, application server 100 can instantiate the user driver 115 and the core workload driver 105. Upon initiation of the user driver 115, parameters such as a UID, a user priority and a WLID associated with a particular user's workload request can be communicated to the system for execution. Input of the UID, user priority and WLID can be facilitated by a GUI. The UID, user priority and WLID can be communicated to the system by placing them in the HTTP header or as in the URL string sent from the user driver 115 to the system. The core workload driver 105 can subsequently parse the HTTP header or the URL string to determine the UID, user priority and WLID. Once the WLID has been determined, the core workload driver 105 can identify which workload in the configuration file 110 corresponds to the determined WLID.

Subsequent to identifying the workload to be executed, the core workload driver 105 will attempt to execute the command(s) defined by the workload in the configuration file 110. The core workload driver 105 contains software logic that will ultimately execute the commands defined for the workload being executed. Factors including the priority of the requesting user, the current load on the system due to other commands being executed and the amount of processing resources that will be required for any requesting workload will be considered by the core workload driver 105. For example, if the core workload driver 105 determines that it is starting to run out of system resources, it could present a textual Java Server Page (JSP) to the user instead of a graphical JSP, since the graphical JSP will consume additional resources for network interactions, which includes the amount of data sent to the user.

In view of the foregoing, the invention can provide an efficient method and system for ensuring that existing traffic flow management policies can effectively accommodate overload conditions in an e-business application server. Notably, a test driver can be used to provide placebo transactions which can supply varying loads to the e-business application server. By supplying varying loads, a determination can be made as to whether the traffic flow management policies can effectively accommodate the overload conditions.

The present invention can be realized in hardware, software, or a combination of hardware and software. A method and apparatus for simulating application workloads according to the present invention can be realized in a centralized fashion in one computer system, or in a distributed fashion where different elements are spread across several interconnected computer systems. Any kind of computer system, or other apparatus adapted for carrying out the methods described herein, is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A method for simulating application workload on an e-business application server hosting a plurality of e-business application programs, comprising:
    forwarding a simulated transaction work request to the e-business application server hosting a plurality of application programs, wherein the simulated transaction work request includes a priority indicator and results in a load being applied to the e-business application server;
    receiving said forwarded simulated transaction work request by a workload driver;
    said workload driver automatically translating said forwarded simulated transaction work request into computer program operations to be performed in the e-business application server based on the priority indicator, wherein said automatically translating step is determined by configuration information contained within a configuration file, said configuration file associating computer program commands with transaction work requests, and wherein reconfiguring said configuration file varies a processing complexity and duration of at least one of the computer program commands; and
    executing said computer program operation in the e-business application server.

2. The method according to claim 1, wherein said translating step further comprises:
    determining a workload based on said forwarded simulated transaction work request; and
    determining based on said determined workload, said computer program operation to be performed for said workload.

3. The method according to claim 1, wherein said forwarding step further comprises sending a user identification (UID), a user priority and a workload identification (WLID) to the workload driver.

4. The method according to claim 3, further comprising encapsulating said user identification (UID), said user priority and said workload identification (WLJD) in a HTTP header prior to said forwarding step.

5. The method according to claim 3, further comprising encapsulating said user identification (UID), said priority and said workload identification (WLID) in a URL string prior to said forwarding step.

6. The method according to claim 3, wherein said forwarding step further comprises sending said UID, said user priority and said WLID from a user driver to said workload driver.

7. The method according to claim 1, wherein said workload driver is a servlet that runs on the e-business application server.

8. The method according to claim 7, further comprising instantiating said workload driver by the application server, and wherein said workload driver is a JAVA class.

9. A system for application workload simulation on an e-business application server hosting a plurality of e-business application programs, the system comprising:
    a user driver for generating simulated transaction work requests having priority indicators, wherein the simulated transaction work request results in a load being applied to the e-business application server;
    a configuration file comprising computer program commands associated with said transaction work requests; and
    a workload driver for automatically determining based on configuration information in said configuration file, which of said computer program commands will be executed in the e-business application server based on the priority indicators;
    wherein reconfiguring said configuration file varies a processing complexity and duration of at least one of said computer program commands.

10. The system according to claim 9, wherein said workload driver is a servlet instantiated by the application server.

11. The system according to claim 10, wherein each of the simulated transaction work requests generated by said user driver comprises a user identification (UID), a priority and a workload identification (WLID).

12. The system according to claim 11, further comprising command classes having varying load processing requirements.

13. The system according to 9, further comprising a URL string having encapsulated therein, a UID, a priority and a WLID, said URL string for communicating said simulated transaction work requests from said user driver to said workload driver.

14. The system according to 9, further comprising a HTTP header having encapsulated therein, a UID, a priority and a WLID, said HTTP header for communicating said simulated transaction work requests from said user driver to said workload driver.

15. A machine readable storage having stored thereon, a computer program having a plurality of code sections, said code sections executable by a machine for causing the machine to perform the steps of:
    forwarding a simulated transaction work request to the e-business application server hosting a plurality of application programs, wherein the simulated transaction work request includes a priority indicator and results in a load being applied to the e-business application server;
    receiving said forwarded simulated transaction work request by a workload driver;
    said workload driver automatically translating said forwarded simulated transaction work request into computer program operations to be performed in the e-business application server based on the priority indicator, wherein said automatically translating step is determined by configuration information contained within a configuration file, said configuration file associating computer program commands with transaction work requests, and wherein reconfiguring said configuration file varies a processing complexity and duration of at least one of the computer program commands; and
    executing said computer program operation in the e-business application server.

16. The machine readable storage according to claim 15, wherein said translating step further comprises:

determining a workload based on said forwarded simulated transaction work request; and determining based on said determined workload, said computer program operation to be performed for said workload.

17. The machine readable storage according to claim 16, wherein said forwarding step further comprises sending a user identification (UID), a user priority and a workload identification (WLID) to the workload driver.

18. The machine readable storage according to claim 17, further comprising encapsulating said user identification (UID), said user priority and said workload identification (WLJD) in a HTTP header prior to said forwarding step.

19. The machine readable storage according to claim 17, further comprising encapsulating said user identification (UID), said priority and said workload identification (WLID) in a URL string prior to said forwarding step.

20. The machine readable storage according to claim 17, wherein said forwarding step further comprises sending said UID, said user priority and said WLID from a user driver to said workload driver.

21. The machine readable storage according to claim 15, wherein said workload driver is a servlet that runs on the e-business application server.

22. The machine readable storage according to claim 21, further comprising instantiating said workload driver by said application server, and wherein said workload driver is a JAVA class.

* * * * *